US012607296B2

(12) United States Patent
Smith et al.

(10) Patent No.: US 12,607,296 B2
(45) Date of Patent: Apr. 21, 2026

(54) VEHICLE CLOSURE MEMBER CABLE DEVICES WITH INTEGRATED FEATURES FOR ADDED FUNCTIONALITY

(71) Applicant: FORD GLOBAL TECHNOLOGIES, LLC, Dearborn, MI (US)

(72) Inventors: Nathan Gregory Smith, Werribee South (AU); Matt Dwyer, Reservoir (AU); Anand Singaram, Taylors Hill (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 431 days.

(21) Appl. No.: 18/178,162

(22) Filed: Mar. 3, 2023

(65) Prior Publication Data

US 2024/0295286 A1      Sep. 5, 2024

(51) Int. Cl.
| | |
|---|---|
| *F16M 13/02* | (2006.01) |
| *B62D 33/03* | (2006.01) |
| *B67B 7/16* | (2006.01) |
| *F16G 11/00* | (2006.01) |
| *B62D 33/027* | (2006.01) |

(52) U.S. Cl.
CPC ............. *F16M 13/02* (2013.01); *B62D 33/03* (2013.01); *B67B 7/16* (2013.01); *F16G 11/00* (2013.01); *B62D 33/0273* (2013.01)

(58) Field of Classification Search
CPC ............................... F16M 13/02; F16M 11/00
See application file for complete search history.

(56) References Cited

U.S. PATENT DOCUMENTS

| | | | | |
|---|---|---|---|---|
| 1,534,211 | A | * | 4/1925 | Hamilton .................. B67B 7/16 |
| | | | | 81/3.27 |
| 5,707,095 | A | * | 1/1998 | Pribak ................ B62D 33/0273 |
| | | | | 292/264 |
| 6,502,885 | B1 | | 1/2003 | Gammon et al. |
| 6,764,122 | B2 | * | 7/2004 | Kharod .................. B62D 33/03 |
| | | | | 296/57.1 |
| 9,248,871 | B1 | * | 2/2016 | Waskie .................. E05C 17/36 |
| 9,278,718 | B1 | * | 3/2016 | Cooper .............. B62D 33/0273 |
| 10,081,292 | B2 | | 9/2018 | Stojkovic et al. |
| 10,994,660 | B2 | | 5/2021 | Ngo |
| 11,097,646 | B2 | | 8/2021 | Dietrich et al. |
| 11,518,449 | B2 | | 12/2022 | Dzurnak et al. |
| 2020/0240184 | A1 | * | 7/2020 | Hemphill .............. E05C 17/365 |
| 2022/0063978 | A1 | | 3/2022 | Arellano Aguilar et al. |
| 2022/0136297 | A1 | | 5/2022 | Roberson et al. |
| 2022/0220782 | A1 | | 7/2022 | Strole et al. |

FOREIGN PATENT DOCUMENTS

DE          102019119364  A1      1/2021

* cited by examiner

*Primary Examiner* — Joseph D. Pape
(74) *Attorney, Agent, or Firm* — Vichit Chea; Carlson, Gaskey & Olds, P.C.

(57)          ABSTRACT

Vehicle closure members are provided that include integrated features for increasing the functionality of the closure member (e.g., a tailgate). A bottle opener feature or an article hanging feature may be integrated as part of a cable connector assembly that connects the closure member to the vehicle body. The integrated feature(s) is therefore conveniently packaged on the vehicle for use during outdoor social gatherings when the closure member is moved to an open position and when the vehicle is in a stationary, non-moving condition.

20 Claims, 6 Drawing Sheets

VEHICLE CLOSURE MEMBER CABLE DEVICES WITH INTEGRATED FEATURES FOR ADDED FUNCTIONALITY

TECHNICAL FIELD

This disclosure relates generally to motor vehicles, and more particularly to vehicle closure member cable devices that are equipped with integrated features for providing added functionality.

BACKGROUND

Vehicles can be utilized as social gathering spots during outdoor activities, such as camping and tailgating activities. Vehicle users typically must remember to carry various tools and convenience items, such as bottle openers for example, on the vehicle for facilitating a more enjoyable experience during the outdoor social activities.

SUMMARY

A tailgate cable connector assembly for a vehicle tailgate according to an exemplary aspect of the present disclosure includes, among other things, a tailgate pivot connector and an accessory bracket secured to the tailgate pivot connector and configured to provide a bottle opener feature or an article hanging feature. The article hanging feature is only intended to be used for hanging articles from the vehicle during stationary, non-moving conditions of the vehicle.

In a further non-limiting embodiment of the foregoing tailgate cable connector assembly, the bottle opener feature is established by a tab and a tooth of the accessory bracket.

In a further non-limiting embodiment of either of the foregoing tailgate cable connector assemblies, an opening is formed through the accessory bracket. An upper edge of the opening includes the tab, and a lower edge of the opening includes the tooth.

In a further non-limiting embodiment of any of the foregoing tailgate cable connector assemblies, the tab and the tooth cooperate to apply an opening force for removing a bottle cap from a bottle.

In a further non-limiting embodiment of any of the foregoing tailgate cable connector assemblies, the article hanging feature is established by a hook of the accessory bracket. The hook is only intended to be used for hanging articles during stationary, non-moving conditions of the vehicle In a further non-limiting embodiment of any of the foregoing tailgate cable connector assemblies, an opening is formed through the accessory bracket. A lower edge of the opening includes the hook.

In a further non-limiting embodiment of any of the foregoing tailgate cable connector assemblies, the accessory bracket is secured to the tailgate pivot connector by a washer.

In a further non-limiting embodiment of any of the foregoing tailgate cable connector assemblies, a fastener is received through the tailgate pivot connector, the accessory bracket, and the washer.

In a further non-limiting embodiment of any of the foregoing tailgate cable connector assemblies, the tailgate pivot connector includes a ferrule portion and a capture portion extending from the ferrule portion.

In a further non-limiting embodiment of any of the foregoing tailgate cable connector assemblies, a cable is connected to the capture portion.

In a further non-limiting embodiment of any of the foregoing tailgate cable connector assemblies, the accessory bracket includes a finger, and the ferrule portion includes a projection that is configured to contact the finger to limit a rotational movement of the tailgate pivot connector.

In a further non-limiting embodiment of any of the foregoing tailgate cable connector assemblies, the accessory bracket includes a tongue for mounting the tailgate cable connector assembly to the vehicle tailgate.

A vehicle according to another exemplary aspect of the present disclosure includes, among other things, a closure member and a cable device including a cable connector assembly mounted to the closure member and a cable connected to the cable connector assembly. The cable connector assembly includes an integrated bottle opener feature or an integrated article hanging feature. The article hanging feature is only intended to be used for hanging articles from the vehicle during stationary, non-moving conditions of the vehicle.

In a further non-limiting embodiment of the foregoing vehicle, a second cable device including a second cable connector assembly is mounted to the closure member and a second cable is connected to the second cable connector assembly.

In a further non-limiting embodiment of either of the foregoing vehicles, the second cable connector assembly includes the other of the integrated bottle opener feature or the integrated article hanging feature.

In a further non-limiting embodiment of any of the foregoing vehicles, the integrated bottle opener feature is established by a tab and a tooth of an accessory bracket of the cable connector assembly.

In a further non-limiting embodiment of any of the foregoing vehicles, the accessory bracket is secured to a pivot connector of the cable connector assembly by a washer.

In a further non-limiting embodiment of any of the foregoing vehicles, a single fastener secures the cable connector assembly to the closure member.

In a further non-limiting embodiment of any of the foregoing vehicles, the integrated article hanging feature is established by a hook of an accessory bracket of the cable connector assembly. The hook is only intended to be used for hanging articles during stationary, non-moving conditions of the vehicle.

In a further non-limiting embodiment of any of the foregoing vehicles, an accessory bracket of the cable connector assembly includes a tongue received within a slot formed in a lateral side of the closure member.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle closure members that include integrated features for increasing the functionality of the closure member (e.g., a tailgate). A bottle opener feature or an article hanging feature may be integrated as part of a cable connector assembly that connects the closure member to the vehicle body. The integrated feature(s) is therefore conveniently packaged on the vehicle for use during outdoor social gatherings when the closure member is moved to an open position and during stationary, non-moving conditions of the vehicle. These and other features of this disclosure are described in greater detail below.

Figure 1:
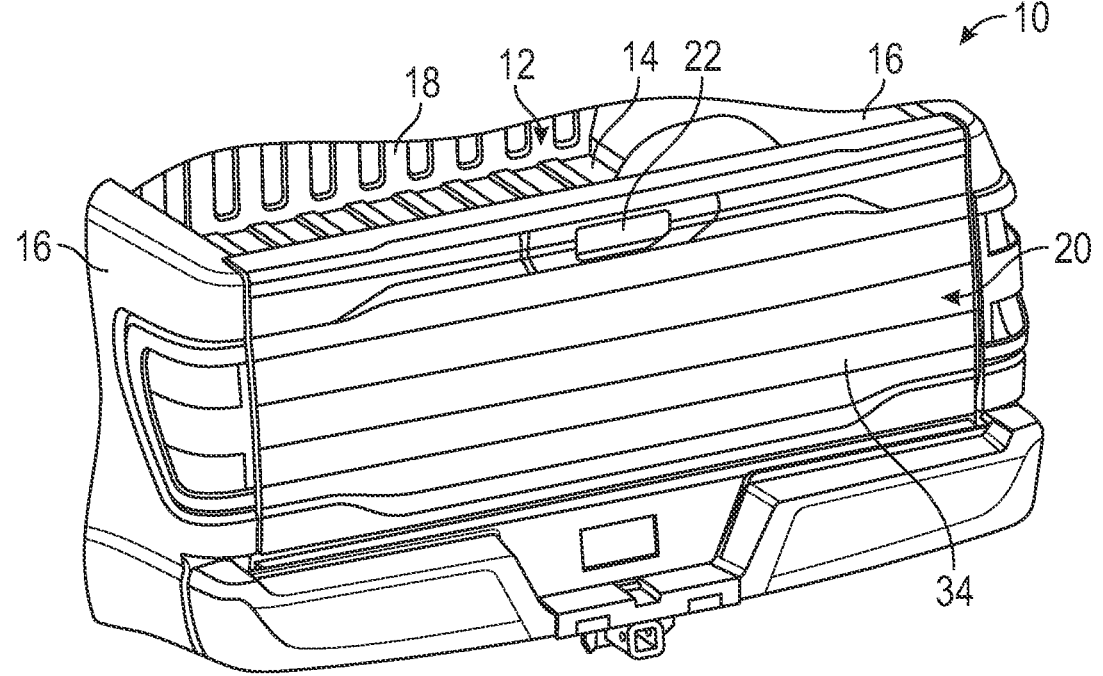
FIG. 1 is a rear perspective view of a motor vehicle equipped with a tailgate positioned in a tailgate closed position.
Figure 2:
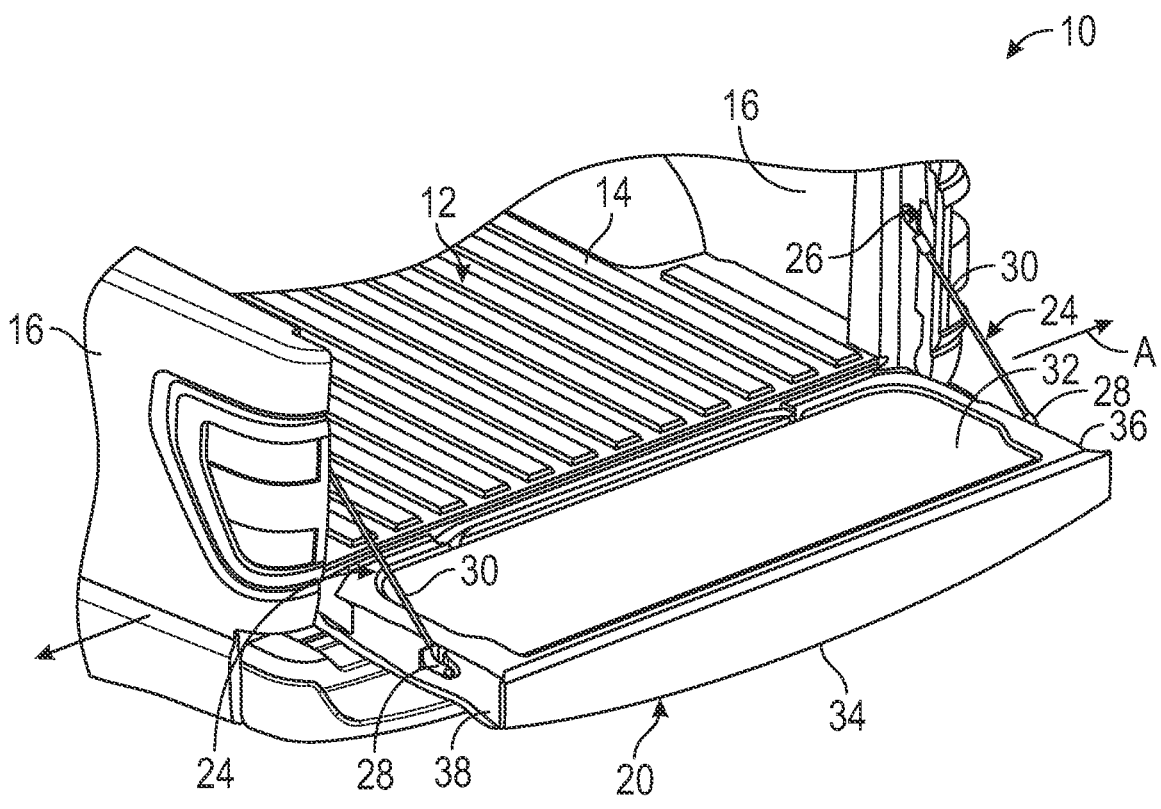
FIG. 2 illustrates a tailgate open position of the tailgate of FIG. 1.

FIGS. 1 and 2 illustrate select portions of a motor vehicle 10 that includes a cargo space for storing and/or hauling one or more items of cargo. In the illustrated embodiment, the vehicle 10 is a pickup truck, and the cargo space is established by a cargo bed 12 of the pickup truck. As would be appreciated by a person of ordinary skill in the art having the benefit of this disclosure, although a pickup truck with a cargo bed is specifically depicted and referenced herein, other vehicles having other types of cargo spaces could also benefit from the teachings of this disclosure. Moreover, the vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component or system.

The cargo bed 12 is generally rearward of a passenger cabin (not shown) of the vehicle 10 and includes a floor 14 extending between a pair of longitudinally extending side walls 16, a laterally extending front wall 18, and a tailgate 20. The overall size, shape, and configuration of the cargo bed 12 are not intended to limit this disclosure. The cargo bed 12 is part of a vehicle body of the vehicle 10.

The tailgate 20 is pivotable about a pivot axis A relative to the cargo bed 12 between a tailgate closed position shown in FIG. 1 and a tailgate open position shown in FIG. 2. The tailgate 20 may be moved from the tailgate closed position to the tailgate open position in response to actuating a handle 22 of the tailgate 20, for example.

The tailgate 20 is vertically aligned when in the tailgate closed position and thus generally encloses an end of the cargo bed 12 that is opposite from the front wall 18. The tailgate 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The tailgate 20 may include an inner side 32, an outer side 34, a first lateral side 36, and a second lateral side 38. The inner side 32 forms the rear wall of the cargo bed 12 when the tailgate 20 is in the tailgate closed position, and the outer side 34 faces rearwardly when the tailgate 20 is in the tailgate closed position.

The first lateral side 36 and the second lateral side 38 may extend between the inner side 32 and the outer side 34 for connecting these sides to one another. In the illustrated embodiment, the first lateral side 36 is a right hand side or passenger side of the vehicle 10, and the second lateral side 38 is a left hand side or driver side of the vehicle 10. Passenger side and driver side, for purposes of this disclosure, are with reference to a vehicle equipped for operation in the United States.

When in the tailgate open position of FIG. 2, the tailgate 20 may be supported relative to the vehicle body of the vehicle 10 by a pair of cable devices 24. One cable device 24 may be provided on each side of the tailgate 20—one on the first lateral side 36 and one on the second lateral side 38.

Each cable device 24 may include a vehicle cable connector assembly 26, a tailgate cable connector assembly 28, and a cable 30 extending therebetween. The vehicle cable connector assembly 26 may couple the cable device 24 to one of the side walls 16 of the vehicle 10, and the tailgate cable connector assembly 28 may couple the respective cable device 24 to the first lateral side 36 or the second lateral side 38 of the tailgate 20.

Together, the cable devices 24 may function as a tailgate support system that helps to support the tailgate 20 when positioned in the tailgate open position of FIG. 2. Moreover, as discussed in greater detail below, additional functionality (e.g., a bottle opener feature, an article hanging feature, etc.) can be integrated into one or both of the tailgate cable connector assemblies 28 in order to increase the functionality of the tailgate 20 for facilitating a more enjoyable user experience, such as when using the vehicle 10 as a social gathering spot during outdoor activities (e.g., camping, tailgating, etc.), for example.

Figure 3:
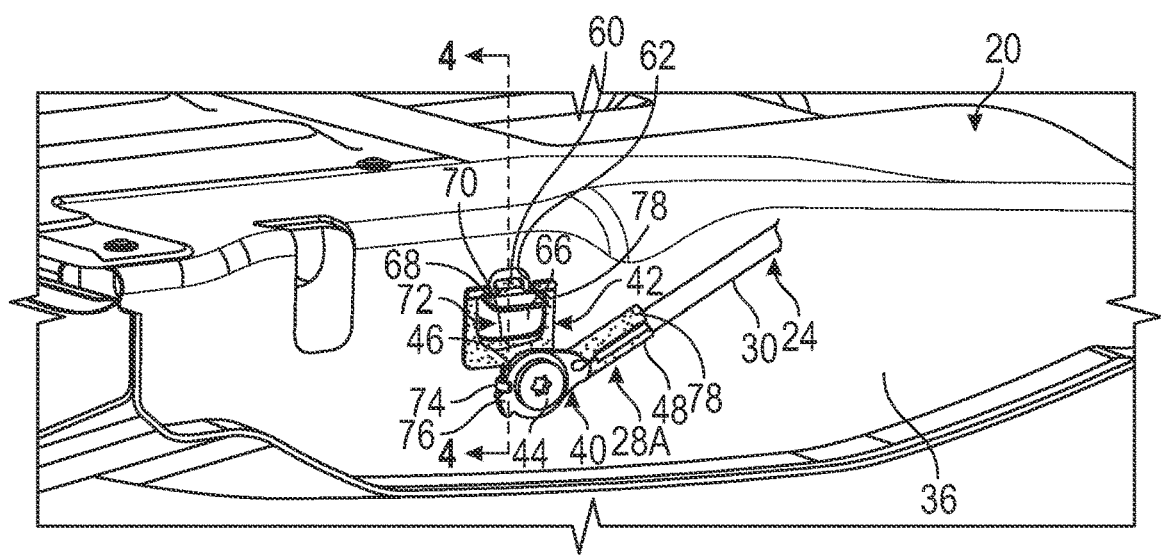
FIG. 3 is a perspective view of a first lateral side of a vehicle tailgate.
Figure 4:
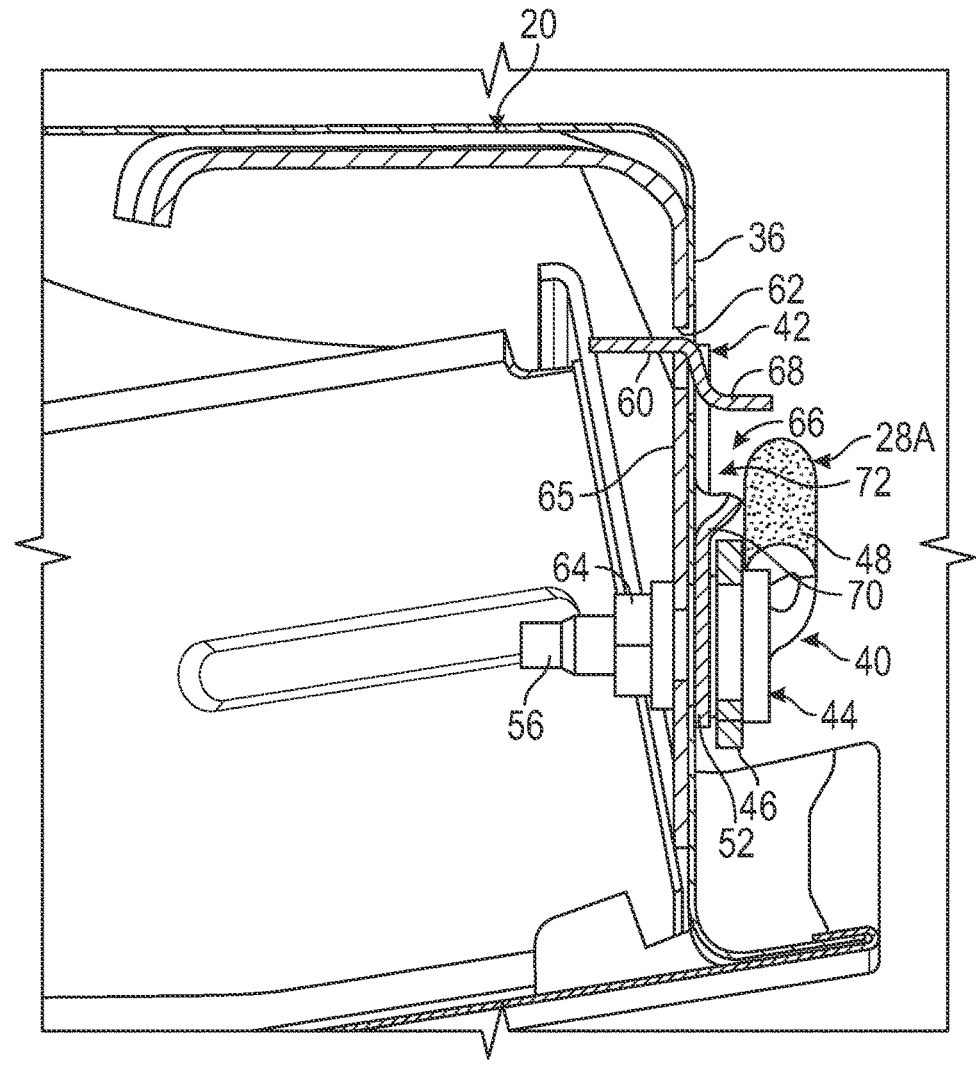
FIG. 4 is a cross-sectional view through section 4-4 of FIG. 3.
Figures 5, 6:
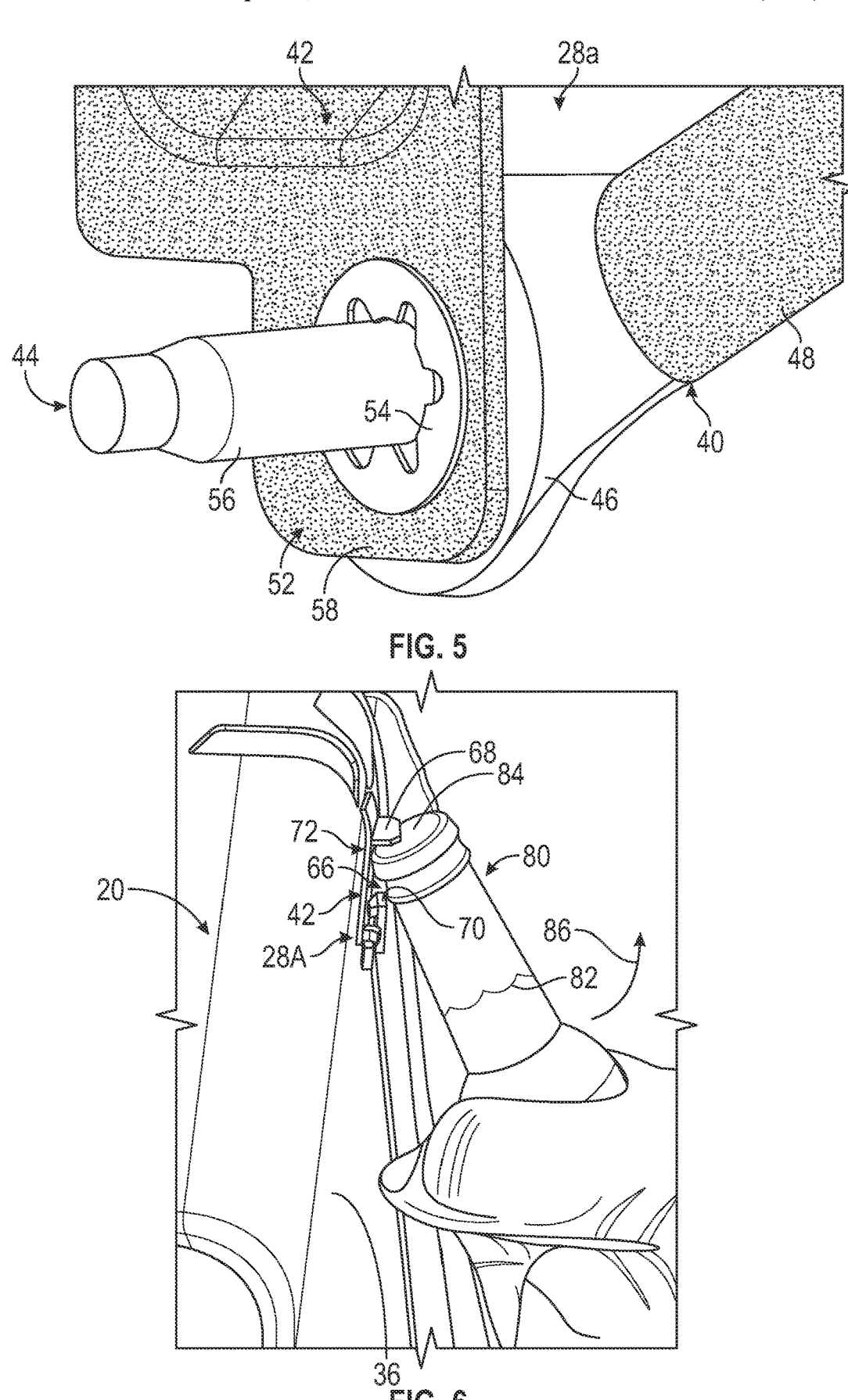
FIG. 5 illustrates a tailgate cable connector assembly for connecting a tailgate to a motor vehicle.
FIG. 6 schematically illustrates an exemplary use of an integrated bottle opener feature of a tailgate cable connector assembly.

FIGS. 3, 4, and 5, with continued reference to FIGS. 1 and 2, illustrate an exemplary tailgate cable connector assembly 28A that can be provided as part of one of the cable devices 24 for supporting the tailgate 20 relative to the vehicle body of the vehicle 10. In the illustrated embodiment, the tailgate cable connector assembly 28A is mounted to the first lateral side 36 of the tailgate 20. However, the tailgate cable connector assembly 28A could alternatively be mounted to the second lateral side 38 of the tailgate 20. As would be appreciated by a person of ordinary skill in the art having the benefit of this disclosure, mounting the tailgate cable connector assembly 28A to the second lateral side 38 would necessitate slight modifications in order to reconfigure the assembly into a left hand configuration rather than a right hand configuration.

The tailgate cable connector assembly 28A may include pivot connector 40, an accessory bracket 42, and a fastener 44. The pivot connector 40, the accessory bracket 42, and the fastener 44 may be preassembled together to establish an integrated unit of the tailgate cable connector assembly 28A.

The pivot connector 40 may include a ferrule portion 46 and a capture portion 48 that extends from the ferrule portion 46. The ferrule portion 46 may be configured to receive the fastener 44 and can be configured to rotate relative to the first lateral side 36 as the tailgate 20 is moved between the open and closed positions of the tailgate 20. The capture portion 48 may include a tubular body that is configured for receiving and attaching the cable 30 of the respective cable device 24 to the tailgate cable connector assembly 28A.

The accessory bracket 42 may include a mounting tab 52 for securing the accessory bracket 42 to the ferrule portion 46 of the pivot connector 40. A washer 54 (e.g., a star washer) may be received over a shaft 56 of the fastener 44 and may be positioned against a rear surface 58 of the mounting tab 52 for securing the accessory bracket 42 relative to the pivot connector 40 (see FIG. 5).

The accessory bracket 42 may additionally include a tongue 60 provided at an opposite side of the accessory bracket 42 from the mounting tab 52. The tongue 60 may be received within a slot 62 formed in the first lateral side 36 of the tailgate 20 for aligning and retaining the tailgate cable connector assembly 28A relative to the first lateral side 36.

The fastener 44 may be inserted through mounting holes formed in each of the ferrule portion 46 of the pivot connector 40, the mounting tab 52 of the accessory bracket 42, and the first lateral side 36 of the tailgate 20 for mounting the tailgate cable connector assembly 28A to the first lateral side 36 of the tailgate 20. The shaft 56 of the fastener 44 may engage a weld nut 64 secured to an interior surface 65 of the first lateral side 36 for fixedly securing the tailgate cable connector assembly 28A in place.

The fastener 44 may be a bolt or any other suitable fastener. In an embodiment, the fastener 44 is the sole fastener required to fixedly mount the tailgate cable connector assembly 28A to the first lateral side 36 of the tailgate 20. The tailgate cable connector assembly 28A therefore provides a single-fastener arrangement.

An opening 66 may be formed through the accessory bracket 42 at a location between the tongue 60 and the mounting tab 52. An upper edge (e.g., a first long side) of the opening 66 may provide a tab 68, and a lower edge (e.g., a second long side) of the opening 66 may provide a tooth 70. The tab 68 and the tooth 70 may each protrude from the accessory bracket 42 in a direction away from the first lateral side 36 of the tailgate 20.

The tab 68 and the tooth 70 may cooperate to provide a bottle opener feature 72 that is integrated as part of the tailgate cable connector assembly 28A. For example, as further discussed below, the tooth 70 may be configured for applying an opening force for removing a bottle cap from a bottle, and the tab 68 may be configured to control the amount of swing necessary to remove the bottle cap from the bottle via the tooth 70. The bottle opener feature 72 therefore provides additional functionality to the tailgate cable connector assembly 28A beyond simply supporting the tailgate 20 relative to the vehicle 10.

A finger 74 may protrude outwardly from the mounting tab 52 of the accessory bracket 42. The finger 74 may extend to a position in which it is capable of interfacing with a projection 76 of the ferrule portion 46 of the pivot connector 40. As the pivot connector 40 rotates during movement of the tailgate 20 between open and closed positions, the projection 76 will eventually contact the finger 74, thereby limiting further rotational movement of the pivot connector 40 in the direction of movement. The finger 74 and the projection 76 may therefore cooperate to nest the cable 30 in a more compact configuration that maintains the cable 30 away from painted surfaces of the tailgate 20 when the tailgate 20 is in the closed position.

The pivot connector 40 and the accessory bracket 42 of the tailgate cable connector assembly 28A may each be constructed from a high strength steel. However, other materials are contemplated within the scope of this disclosure.

In some implementations, the pivot connector 40 and the accessory bracket 42 may each be coated with a protective coating 78 (shown schematically in FIG. 3). The protective coating 78 may be adapted for limiting wear and corrosion during the operable life of the tailgate cable connector assembly 28A. The protective coating 78 may be a zinc-nickel alloy coating or any other suitable protective coating.

FIG. 6, with continued reference to FIGS. 1-5, schematically illustrates the use of the integrated bottle opener feature 72 of the tailgate cable connector assembly 28A for opening a bottle 80 that contains a beverage 82. Prior to opening, the beverage 82 is contained within the bottle 80 by a bottle cap 84. The bottle opener feature 72 may be used to remove the bottle cap 84 without spilling the beverage 82.

The bottle opener feature 72 is accessible by users when the tailgate 20 is in the tailgate open position and is therefore conveniently packaged near the cargo bed 12 of the vehicle 10 as part of the tailgate cable connector assembly 28A. The bottle opener feature 72 may be used during outdoor social gathering and eliminates the need for the user to remember to carry a separate bottle opener.

The bottle cap 84 may be removed from the bottle 80 via the bottle opener feature 72 in the following exemplary manner. A user may first position the bottle 80 so the bottle cap 84 is at least partially received within the opening 66 of the accessory bracket 42 at a location between the tab 68 and the tooth 70. The positioning of the tab 68 relative to the opening 66 forces the user to position the bottle 80 at a specific angle relative to the bottle opener feature 72. In particular, the tab 68 positions the bottle 80 such that an upward swing path (shown schematically via arrow 86) is required to remove the bottle cap 84 from the bottle 80. The user is thus not permitted to position the bottle 80 at a downward angle relative to the bottle opener feature 72, thereby substantially eliminating spills.

As the user moves the bottle 80 along the upward swing path 86, the bottle cap 84 is moved into engagement with the tooth 70, thereby applying an opening force for removing the bottle cap 84 from the bottle 80. The tab 68 may support and stabilize the bottle 80 during its movement along the upward swing path 86.

Figure 7:
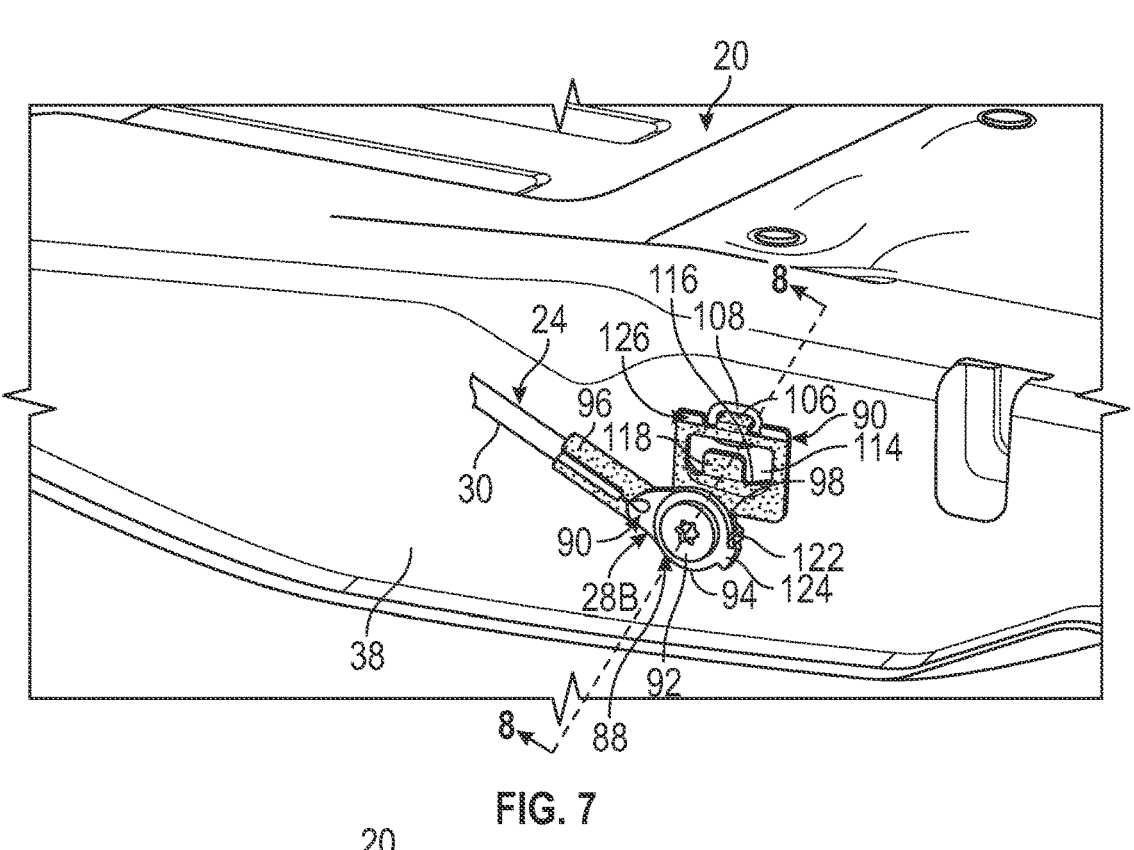
FIG. 7 is a perspective view of a second lateral side of a vehicle tailgate.
Figure 8:
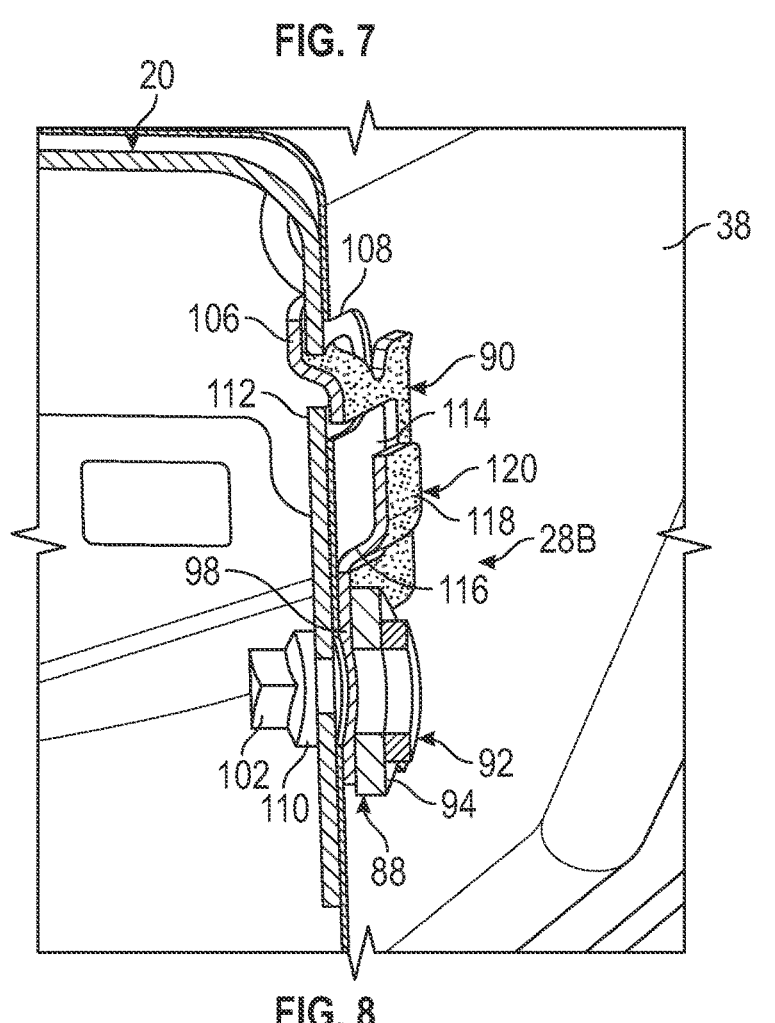
FIG. 8 is a cross-sectional view through section 8-8 of FIG. 7.
Figure 9:
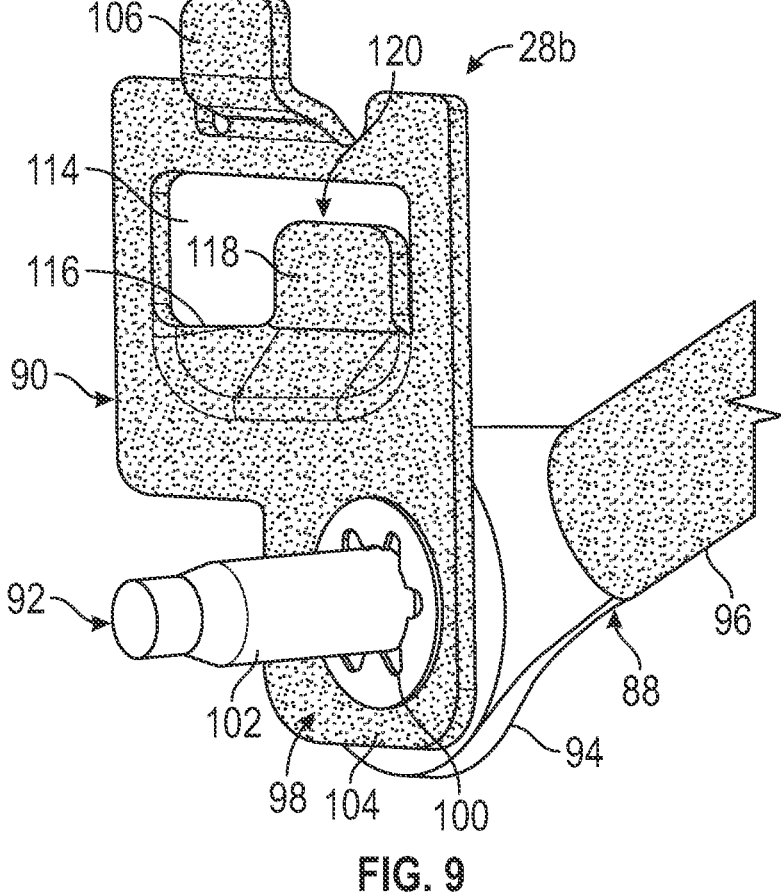
FIG. 9 illustrates another tailgate cable connector assembly for connecting a tailgate to a motor vehicle.

FIGS. 7, 8, and 9, with continued reference to FIGS. 1 and 2, illustrate another exemplary tailgate cable connector assembly 28B that can be provided as part of one of the cable devices 24 for supporting the tailgate 20 relative to the vehicle 10. In the illustrated embodiment, the tailgate cable connector assembly 28B is mounted to the second lateral side 38 of the tailgate 20. However, the tailgate cable connector assembly 28B could alternatively be mounted to the first lateral side 36 of the tailgate 20. As would be appreciated by a person of ordinary skill in the art having the benefit of this disclosure, mounting the tailgate cable connector assembly 28B to the first lateral side 36 would necessitate slight modifications in order to reconfigure the assembly into a right hand configuration rather than a left hand configuration.

The tailgate cable connector assembly 28B may include pivot connector 88, an accessory bracket 90, and a fastener 92. The pivot connector 88, the accessory bracket 90, and the fastener 92 may be connected together to establish the tailgate cable connector assembly 28B.

The pivot connector 88 may include a ferrule portion 94 and a capture portion 96 that extends from the ferrule portion 94. The ferrule portion 94 may be configured to receive the fastener 92 such that the ferrule portion 94 can rotate relative to the second lateral side 38 as the tailgate 20 is moved between the open and closed positions of the tailgate 20. The capture portion 96 may include a tubular body that is configured for receiving and attaching the cable 30 of the respective cable device 24 to the tailgate cable connector assembly 28B.

The accessory bracket 90 may include a mounting tab 98 for securing the accessory bracket 90 to the ferrule portion 94 of the pivot connector 88. A washer 100 (e.g., a star washer) may be received over a shaft 102 of the fastener 92 and may be positioned against a rear surface 104 of the mounting tab 98 for securing the accessory bracket 90 relative to the pivot connector 88 (see FIG. 9).

The accessory bracket 90 may additionally include a tongue 106 provided at an opposite side of the accessory bracket 90 from the mounting tab 98. The tongue 106 may be received within a slot 108 formed in the second lateral side 38 of the tailgate 20 for aligning and retaining the tailgate cable connector assembly 28B relative to the second lateral side 38.

The fastener 92 may be inserted through mounting holes formed in each of the ferrule portion 94 of the pivot connector 88, the mounting tab 98 of the accessory bracket 90, and the second lateral side 38 of the tailgate 20 for mounting the tailgate cable connector assembly 28B to the second lateral side 38 of the tailgate 20. The shaft 102 of the fastener 92 may engage a weld nut 110 secured to an interior surface 112 of the second lateral side 38 for fixedly securing the tailgate cable connector assembly 28B in place.

The fastener 92 may be a bolt or any other suitable fastener. In an embodiment, the fastener 92 is the sole fastener required to fixedly mount the tailgate cable connector assembly 28B to the second lateral side 38 of the tailgate 20.

An opening 114 may be formed through the accessory bracket 90 at a location between the tongue 106 and the mounting tab 98. A lower edge 116 (e.g., lower long side) of the opening 114 may bulge outwardly from the accessory bracket 90 in a direction away from the second lateral side 38 of the tailgate 20. A hook 118 may protrude upwardly from the lower edge 116. The lower edge 116 and the hook 118 may cooperate to provide an article hanging feature 120 that is integrated as part of the tailgate cable connector assembly 28B. For example, the hook 118 may be used to suspend a grocery bag or some other article from the tailgate cable connector assembly 28B. The article hanging feature 120 therefore provides additional functionality to the tailgate cable connector assembly 28B beyond simply supporting the tailgate 20 relative to the vehicle 10. The article hanging feature 120 is only intended to be used for hanging articles from the vehicle 10 during stationary, non-moving conditions of the vehicle.

A finger 122 may protrude outwardly from the mounting tab 98 of the accessory bracket 90. The finger 122 may extend to a position in which it is capable of interfacing with a projection 124 of the ferrule portion 94 of the pivot connector 88. As the pivot connector 88 rotates during movement of the tailgate 20 between open and closed positions, the projection 124 will eventually contact the finger 122, thereby limiting further rotational movement of the pivot connector 88 in one direction. The finger 122 and the projection 124 may therefore cooperate to nest the cable 30 in a more compact configuration that maintains the cable 30 away from painted surfaces of the tailgate 20 when the tailgate 20 is in the closed position.

The pivot connector 88 and the accessory bracket 90 of the tailgate cable connector assembly 28B may each be made of a high strength steel. However, other materials are contemplated within the scope of this disclosure.

In some implementations, the pivot connector 88 and the accessory bracket 90 may each be coated with a protective coating 126 (shown schematically in FIG. 7). The protective coating 126 may be adapted for limiting wear and corrosion during the operable life of the tailgate cable connector assembly 28B. The protective coating 126 may be a zinc-nickel alloy coating or any other suitable protective coating.

Figure 10:
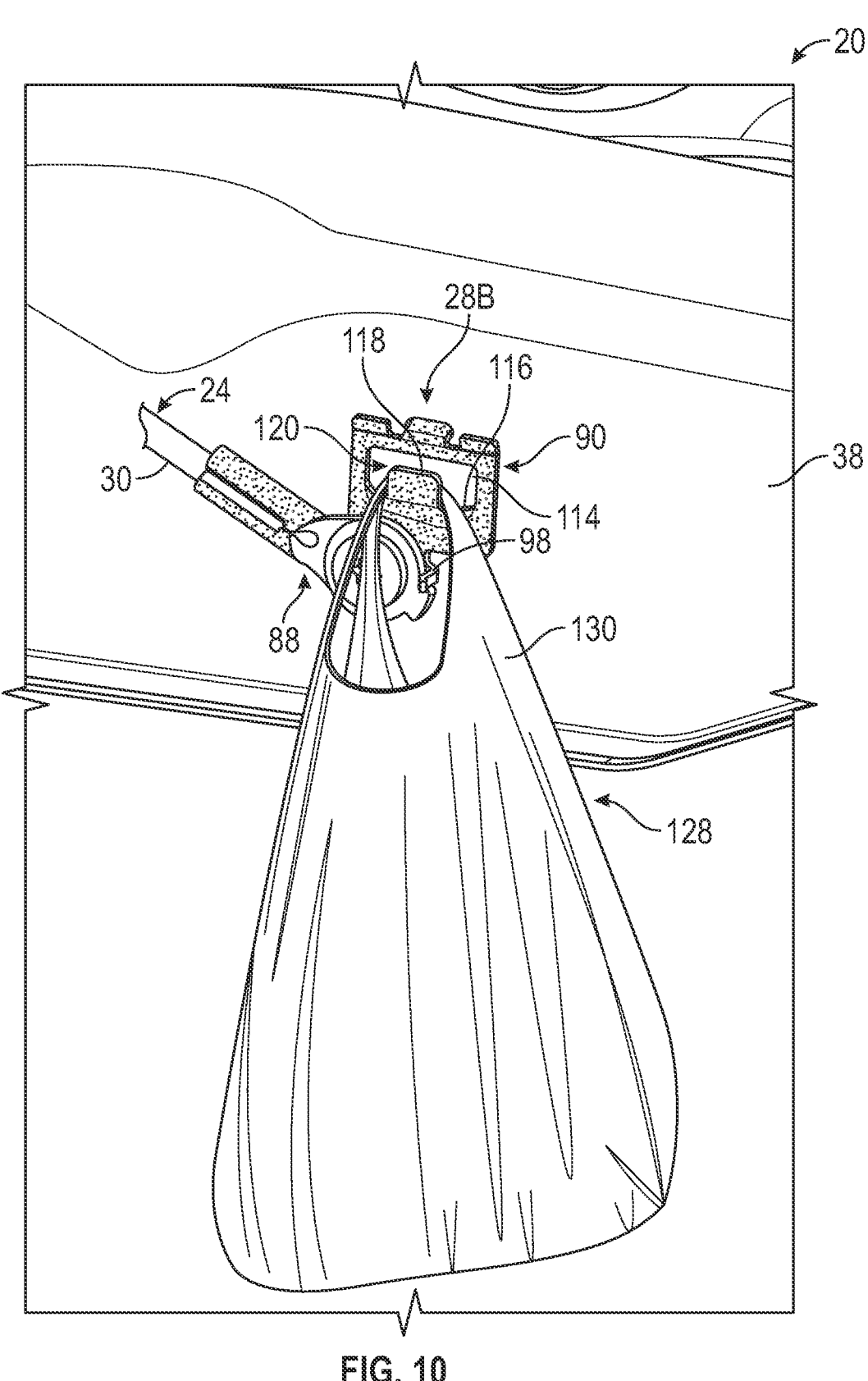
FIG. 10 schematically illustrates an exemplary use of an integrated article hanging feature of a tailgate cable connector assembly.

FIG. 10, with continued reference to FIGS. 7-9, schematically illustrates an exemplary use of the integrated article hanging feature 120 of the tailgate cable connector assembly 28B for suspending an article 128 (e.g., a bag) from the tailgate 20. The article hanging feature 120 is accessible by users when the tailgate 20 is in the tailgate open position and the vehicle 10 is stationary and is therefore conveniently packaged near the cargo bed 12 as part of the tailgate cable connector assembly 28B. The article hanging feature 120 may be used during outdoor social gatherings, such as to provide a convention location for collecting trash, for example.

The article hanging feature 120 may be used in the following manner during stationary, non-moving conditions of the vehicle. A user may first position one or more handles 130 of the article 128 around the hook 118. The article 128 may then be pulled downwardly until an apex of the handle 130 is received against the lower edge 116 of the opening 114 of the accessory bracket 90. The article 128 is then conveniently suspended from the tailgate cable connector assembly 28B and available for use.

In the illustrated embodiments discussed above, the bottle opener feature 72 may be integrated as part of the tailgate cable connector assembly 28A and is provided on the right hand side of the tailgate 20, and the article hanging feature 120 may be integrated a part of the tailgate cable connector assembly 28B and is provided on the left hand side of tailgate 20. However, an opposite configuration could be implemented in which the bottle opener feature 72 is provided on the left hand side of tailgate 20, and the article handing feature 120 is provided on the right hand side of the tailgate 20. In other implementations, the bottle opener feature 72 could be provided as part of tailgate cable connector assemblies 28A, 28B on both sides of the tailgate 20. In still other implementations, the article hanging feature 120 could be provided as part of tailgate cable connector assemblies 28A, 28B on both sides of the tailgate 20. Therefore, this disclosure is not intended to be limited to exact configurations shown in the figures and described herein.

Although illustrated with specific reference to a vehicle tailgate in the foregoing embodiments, the cable connector assembly teachings of this disclosure extend to other vehicle closure members. For example, cable connector assemblies for pivotably connecting a front trunk or "frunk" grille panel to the vehicle body could include integrated bottle opener or article hanging features within the scope of this disclosure.

The cable connector assemblies of this disclosure include integrated bottle opener or article hanging features that are packaged together with pivot connectors of the cable connector assemblies, thereby adding additional functionality to the closure member support system without requiring additional parts or complexity. The integrated features are conveniently located near the cargo space of the vehicle and are accessible when the closure member is open to facilitate a more enjoyable usage and experience during outdoor social gatherings when the vehicle is stationary.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tailgate cable connector assembly for a vehicle tailgate, comprising:
   a tailgate pivot connector; and
   an accessory bracket secured to the tailgate pivot connector and configured to provide an article hanging feature,
   wherein the article hanging feature is established by a hook of the accessory bracket, and an opening is formed through the accessory bracket, and further wherein a lower edge of the opening includes the hook.

2. The tailgate cable connector assembly as recited in claim 1, wherein the accessory bracket is secured to the tailgate pivot connector by a washer.

3. The tailgate cable connector assembly as recited in claim 2, comprising a fastener received through the tailgate pivot connector, the accessory bracket, and the washer.

4. The tailgate cable connector assembly as recited in claim 1, wherein the tailgate pivot connector includes a ferrule portion and a capture portion extending from the ferrule portion.

5. The tailgate cable connector assembly as recited in claim 4, comprising a cable connected to the capture portion.

6. The tailgate cable connector assembly as recited in claim 1, wherein the accessory bracket includes a tongue for mounting the tailgate cable connector assembly to the vehicle tailgate.

7. The tailgate cable connector assembly as recited in claim 2, wherein the washer is received against a rear surface of a mounting tab of the accessory bracket to secure the mounting tab to a ferrule portion of the tailgate pivot connector.

8. The tailgate cable connector assembly as recited in claim 7, wherein a single fastener is received through the ferrule portion of the tailgate pivot connector and the mounting tab of the accessory bracket to preassemble the tailgate cable connector assembly.

9. The tailgate cable connector assembly as recited in claim 8, wherein the washer is received over a shaft of the single fastener.

10. A tailgate cable connector assembly for a vehicle tailgate, comprising:
    a tailgate pivot connector; and
    an accessory bracket secured to the tailgate pivot connector and configured to provide a bottle opener feature or an article hanging feature,
    wherein the tailgate pivot connector includes a ferrule portion and a capture portion extending from the ferrule portion,
    wherein the accessory bracket includes a finger, and the ferrule portion includes a projection that is configured to contact the finger to limit a rotational movement of the tailgate pivot connector.

11. The tailgate cable connector assembly as recited in claim 10, wherein the bottle opener feature is established by a tab and a tooth of the accessory bracket.

12. The tailgate cable connector assembly as recited in claim 11, comprising an opening formed through the accessory bracket, and wherein an upper edge of the opening includes the tab, and a lower edge of the opening includes the tooth.

13. The tailgate cable connector assembly as recited in claim 11, wherein the tab and the tooth cooperate to remove a bottle cap from a bottle as a user moves the bottle along a swing path relative to the bottle opener feature.

14. A vehicle, comprising:
    a closure member;
    a cable device including a cable connector assembly mounted to the closure member and a cable connected to the cable connector assembly;
    the cable connector assembly including a pivot connector; and an accessory bracket; and
    the accessory bracket includes an integrated bottle opener feature, wherein the bottle opener feature includes an opening formed through the accessory bracket, the opening having an upper edge including a tab and a lower edge including a tooth, the tab and tooth defining opposed cap-engaging surfaces separated by a clearance sized to receive a cap of a bottle, the tab and tooth being positioned to apply an opening force to remove the cap as the bottle moves along a swing path relative to the opening.

15. The vehicle as recited in claim 14, comprising a second cable device including a second cable connector assembly mounted to the closure member and a second cable connected to the second cable connector assembly, wherein the second cable connector assembly includes an integrated article hanging feature.

16. The vehicle as recited in claim 14, wherein the accessory bracket is secured to the pivot connector of the cable connector assembly by a washer.

17. The vehicle as recited in claim 15, wherein the integrated article hanging feature is established by a hook of an accessory bracket of the second cable connector assembly.

18. The vehicle as recited in claim 14, wherein the accessory bracket of the cable connector assembly includes a tongue received within a slot formed in thea lateral side of the closure member.

19. The vehicle as recited in claim 14, wherein the cable connector assembly includes a single fastener hat is received through a ferrule portion of the pivot connector, a mounting tab of the accessory bracket, and a lateral side of the closure member to secure the cable connector assembly to the closure member.

20. The vehicle as recited in claim 14, wherein the opening lies in a plane substantially parallel to a lateral side of the closure member when installed, and the tab and tooth are positioned along a perimeter of the opening to apply the opening force as the bottle moves along the swing path.

<center>* * * * *</center>